United States Patent
Han et al.

(10) Patent No.: US 9,781,943 B2
(45) Date of Patent: Oct. 10, 2017

(54) TEA BEVERAGE AND METHOD FOR PRODUCING THE SAME

(75) Inventors: Zhengchun Han, Zhejiang (CN); Yuan Huang, Zhejiang (CN); Jiping Zhong, Zhejiang (CN); Lian Xue, Zhejiang (CN)

(73) Assignee: NONGFU SPRING CO., LTD., Zhejiang (CN)

( * ) Notice: Subject to any disclaimer, the term of this patent is extended or adjusted under 35 U.S.C. 154(b) by 0 days.

(21) Appl. No.: 14/114,013

(22) PCT Filed: Apr. 16, 2012

(86) PCT No.: PCT/CN2012/074064
§ 371 (c)(1),
(2), (4) Date: Jan. 9, 2014

(87) PCT Pub. No.: WO2012/146134
PCT Pub. Date: Nov. 1, 2012

(65) Prior Publication Data
US 2014/0127373 A1    May 8, 2014

(30) Foreign Application Priority Data

Apr. 29, 2011 (CN) .......................... 2011 1 0115712

(51) Int. Cl.
*A23F 3/18* (2006.01)
*A23F 3/16* (2006.01)

(52) U.S. Cl.
CPC ................ *A23F 3/163* (2013.01); *A23F 3/18* (2013.01)

(58) Field of Classification Search
CPC .......... A23V 2002/00; A23V 2250/708; A23V 2200/02; C08L 2666/02; C08L 1/02; C08L 97/02; C08L 53/02; C08L 101/00; C08L 5/08; C08L 75/04; C08L 75/16; C08L 83/04; C08L 2666/04; C08L 2666/14; C08L 79/02; C08L 95/00
See application file for complete search history.

(56) References Cited

U.S. PATENT DOCUMENTS

| | | | |
|---|---|---|---|
| 7,811,619 B2 * | 10/2010 | Itaya et al. .................... | 426/597 |
| 7,976,887 B2 | 7/2011 | Inoue et al. | |
| 2007/0003683 A1 * | 1/2007 | Inoue et al. .................. | 426/594 |
| 2009/0191319 A1 * | 7/2009 | Sasame et al. ............... | 426/324 |

FOREIGN PATENT DOCUMENTS

| | | |
|---|---|---|
| CN | 1391819 A | 1/2003 |
| CN | 1653926 A | 8/2005 |
| CN | 1718030 A | 1/2006 |
| CN | 101455250 A | 6/2009 |
| CN | 100544606 C | 9/2009 |
| JP | 09-252752 | 9/1997 |
| JP | 2009-55908 | 3/2009 |
| JP | 2009-106164 | 5/2009 |

OTHER PUBLICATIONS

Chinese Office Action dated Aug. 29, 2014 for Appln. No. 201110115712.4.
Taiwanese Office Action dated Feb. 18, 2014.
Junfeng, Yin; "Sterilization technology in tea beverage processing"; China Tea Mar. 2006; China Academic Journal Electronic Publishing House 1994, pp. 17-18.
Japanese Office Action dated Jun. 23, 2015 for Appln. No. 2014-506738.
English-language translation of International Search Report issued in WO 2012/146134 A1 (PCT/CN2012/074064) dated Jul. 12, 2012 (two pages).

* cited by examiner

*Primary Examiner* — Jill Warden
*Assistant Examiner* — Hong T Yoo
(74) *Attorney, Agent, or Firm* — Pillsbury Winthrop Shaw Pittman LLP

(57) ABSTRACT

Disclosed is a tea beverage and production method therefor. The tea beverage comprises tea, reverse-osmosis water which is deoxidized and deionized, and a food antioxidant, and the oxygen content in the freshly packaged tea beverage is ≤1 mg/L.

5 Claims, No Drawings

TEA BEVERAGE AND METHOD FOR PRODUCING THE SAME

CROSS-REFERENCE TO RELATED APPLICATIONS

This is the U.S. National Stage of PCT/CN2012/074064, filed Apr. 16, 2012, which in turn claims priority to Chinese Patent Application No. 201110115712.4, filed Apr. 29, 2011, the entire contents of all applications are incorporated herein by reference in their entireties.

TECHNICAL FIELD

The invention relates to a tea beverage and a method for producing the same. The tea beverage and the tea beverage produced by the method have fresh tea fragrance, significantly reduce unpleasant odor resulted from hot extraction at high temperature and sterilization at high temperature, significantly weaken color browning during storage, and keep the fresh flavor of tea well; moreover, the freshly potted tea beverage has an oxygen content of $\leq 1$ mg/L.

BACKGROUND ART

Recently, tea beverages, which are natural, healthy, instant and convenient, enjoy quickly increased popularity at home and abroad, and become the most promising and potential beverages. However, most of tea beverages in the current market of China are those containing sugar and flavoring agents, which change the purely natural flavors of tea leaves and do not really reflect the natural and healthy characteristics of tea leaves. Although pure tea beverages reflect the natural and healthy characteristics of tea leaves, the current pure tea beverages in market more or less have the following problems due to the current processing devices and processing procedures.
  1. The extraction process of tea leaves generally refers to hot extraction, and as the extraction temperature and time increase, the tea soup (in particular, green tea and scented tea (based on green tea)) turns dark easily and has a stewed flavor and taste, and therefore the quality of the extraction liquid of tea leaves can hardly be guaranteed and the flavor of the tea soup begins to deteriorate during extraction.
  2. During the process of sterilization, ultra high temperature short time sterilization technique has been widely applied. In order to reduce oxidization of tea polyphenols and alteration of flavor ingredients at high temperature, the tea soup is generally subjected to the degassing treatment (such as under vacuum) before sterilization. However, the degassing treatment per se would cause a great loss of fragrant substances in the tea soup and result in insufficient fragrance of the tea beverages.
  3. As for filling processes, aseptic cold filling is not widely applied yet, and hot filling is the dominant filling. Since hot filling is carried out at a relatively high temperature, the flavor of the tea soup is further deteriorated.
  4. During storage, color browning is serious, fragrance is dull, and taste intensity and fresh feeling reduce in tea beverages.

As to the above-mentioned problems, people have been looking for the solutions and techniques for solving them all the time. For example, the employment of low-temperature extraction can reduce the oxidization of tea polyphenols to some extent as compared to hot extraction. However, low-temperature extraction ($\leq 40°$ C.) has a low extraction efficiency and takes a long time, and therefore cannot meet the requirement of large-scale production of tea beverages obviously. In order to solve the problem of color browning in tea soup, some antioxidants are generally used, however, they may result in impure taste of the tea soup and loss of the natural flavor of tea leaves.

CONTENTS OF INVENTION

The object of the invention is to provide a method for processing tea beverages, which is scientific and is not hard to master and operate. The tea beverages produced by the method have fresh tea fragrance, significantly alleviate the reduction in quality of tea extraction liquid (such as color darkening of tea extraction liquid, loss of fragrance, and reduced mouthfeel) brought about by the disruption of the contents in the tea extraction liquid due to hot extraction and sterilization at high temperature, and remarkably weaken color browning and keep the fresh flavor of tea beverage well during storage.

The invention relates to the tea beverage, comprising tea leaves, reverse-osmosis water that is deoxygenated and deionized, and an edible antioxidant in an amount of 0.02-0.05 wt %, based on the weight of the tea beverage, wherein the reverse-osmosis water that is deoxygenated and deionized, has an oxygen content of $\leq 1$ mg/L, and the immediately potted tea beverage has an oxygen content of $\leq 1$ mg/L.

The invention also relates to a method for producing a tea beverage, comprising: putting tea leaves (green tea, black tea, oolong tea, scented tea, etc.) into a closed extraction tank, adding reverse-osmosis hot water (40-95° C.) that is deoxygenated and deionized, to the tank, at a ratio of tea:water=1:20-120 (by weight); performing extraction for 10-30 minutes to obtain an extraction liquid; clearing the extraction liquid by filtration (centrifugation and hop-pocket) to obtain a tea extraction liquid or a clear liquor; adding the tea clear liquor to a closed blending tank; diluting and blending it with reverse-osmosis water that is deoxygenated and deionized, at a ratio of 1:1-10 by weight; adding an edible antioxidant such as ascorbic acid in an amount of 0.02-0.05 wt %, based on the total amount of the diluted tea extraction liquid; subjecting the blended tea extraction liquid to ultra high temperature short time sterilization (UHT) and then subjecting it to aseptic cold filling. The method has the following important characteristics: 1) water for extraction and blending is reverse-osmosis water that is deoxygenated and deionized and has an oxygen content of $\leq 1$ mg/L; 2) the whole process is performed in closed environment, all of the extraction, holding and blending tanks are closed; 3) high pure nitrogen ($\geq 99\%$) is injected to replace air in each of the closed tanks in advance, prior to adding the reverse-osmosis water that is deoxygenated and deionized, the extraction liquid or the tea clear liquor, and the whole process is carried out under nitrogen protection; 4) the blended tea extraction liquid or tea beverage has a dissolved oxygen content of $\leq 1$ mg/L; 5) no degassing treatment is performed before subjecting the tea extraction liquid or tea beverage to ultra high temperature short time sterilization; and 6) during aseptic filling, the aseptic tank is pressured with aseptic nitrogen and the PET bottles are purged with aseptic nitrogen before capping.

According to the invention, the key of said characteristics of the invention lies in the control of oxygen content of the gases contacting with the tea leaves and tea extraction liquid during the whole process, so that the water for extraction and the blended tea extraction liquid or tea beverages have an oxygen content of ≤1 mg/L.

According to the invention, the tea beverages of the invention include, but are not limited to, pure tea beverages, which refer to tea beverages that comprise tea and water only in addition to a small amount of edible oxidants, and do not comprise other additives, such as sugar or other flavoring agents; or the pure tea beverages comprising other additives such as flavoring agents.

According to the invention, the types of the tea leaves used in the invention are not specifically limited, for example, are green tea, black tea, oolong tea, scented tea, etc.

According to the invention, the reverse-osmosis water that is deoxygenated and deionized, as used in the invention, refers to the one with an oxygen content of ≤1 mg/L.

Furthermore, during extraction of tea leaves with hot water, tea polyphenols, especially catechins, are easily oxidized and converted under heating, resulting in that the color of the tea extraction liquid (in particular, green tea and scented tea based on green tea) turns dark, and the taste of the tea extraction liquid loses freshness. The fragrant ingredients of tea leaves are generally volatile small molecules such as alcohol and aldehyde, which during hot extraction, are easily volatilized and oxidized under heating, thereby changing and deteriorating the fragrant type. During all these oxidization and chemical changes, oxygen is an important participant. During the extraction of tea leaves according to the invention, closed extraction tanks are used, and reverse-osmosis water that is deoxygenated and deionized and has an oxygen content of ≤1 mg/L, is used for extraction. High pure nitrogen is injected to replace air in an extraction tank prior to the extraction with hot reverse-osmosis water that is deoxygenated and deionized, and the whole process is carried out under nitrogen protection, which not only prevents the tea leaves and the tea soup during extraction from contacting oxygen in air, but also minimizes the oxygen content in the gas and tea soup in the tank, thereby reducing the oxidization reaction and conversion upon heating of tea polyphenols and fragrant ingredients to the largest extent during hot extraction, avoiding disadvantageous effects on the tea extraction liquid caused by hot extraction of tea leaves, and retaining the original flavor of tea leaves in the tea extraction liquid obtained by hot extraction in the first step. The disadvantageous effects refer to the color darkening of the tea extraction liquid and loss of fresh taste due to the oxidization and structural conversion of tea polyphenols; loss of fragrant ingredients and deficiency in and deterioration of the fragrance of the tea extraction liquid due to oxidization upon heating.

Furthermore, during clearing and blending, closed holding tanks and blending tanks are also used to contain the tea extraction liquid; high pure nitrogen (≥99%) is injected to replace air in the tanks in advance, and the whole process is carried out under nitrogen protection to ensure that the blended tea extraction liquid has a dissolved oxygen content of ≤1 mg/L. Since the blended tea extraction liquid has a very low dissolved oxygen content, the tea extraction liquid needs no degassing treatment prior to UHT sterilization. It has the following advantages: (1) reduction in the loss of fragrance of the tea soup due to degassing, and (2) since the dissolved oxygen content is very low in the tea extraction liquid, the oxidization of and structural conversion of tea polyphenols and the fragrant ingredients of the tea extraction liquid are reduced at the high temperature during UHT sterilization, thereby minimize the change in color, taste and fragrance of the tea extraction liquid after UHT sterilization.

During the aseptic cold filing of the invention, the gas for pressuring the aseptic tank is aseptic high pure nitrogen (≥99%), thereby retaining the low oxygen content in the tea extraction liquid during filling. During aseptic cold filling, the PET plastic bottles are purged with nitrogen before capping, thereby reducing the oxygen content of the air in top gap of the bottles and reducing the oxygen content in the finished tea beverages, so as to ensure a significant reduction in the rate and extent of the browning of the tea beverages and of the deterioration of the fragrance during storage, and to better retain the fresh flavor of the tea extraction liquid or of the tea leaves in the beverages.

The following comparison data shows that the nitrogen injection-oxygen control process as described in the invention can significantly reduce the oxidization and structural conversion of catechins in tea beverages after high-temperature sterilization and the browning rate and extent of tea beverages during storage. Product 1: the tea beverage products, as prepared by using the same raw materials following the same steps in Examples 1-4, except that the conventional manufacture process without nitrogen injection-oxygen control was employed; Product 2: the tea beverage products, as prepared by the nitrogen injection-oxygen control process in Examples 1-4. In Table 1, product 1 (after UHT) corresponds to the product of Example 1 obtained by using the conventional manufacture process without nitrogen injection-oxygen control.

TABLE 1

Change in the catechin ingredients of green tea before and after UHT sterilization during the process without the control of oxygen and during the process with the control of oxygen.

| Process | Peak area | | | | | |
|---|---|---|---|---|---|---|
| | EGC | DC | EGCG | EC | GCG | ECG |
| Before UHT | 366.7 | 64.4 | 3119.6 | 373 | 128.6 | 672.2 |
| Product 1 after UHT | 140.2 | 262.9 | 1245.2 | 248 | 1842.4 | 348 |
| Product of Example 1 after UHT | 360.1 | 128.3 | 2783.5 | 302.9 | 519.7 | 524.8 |

(Note: the peak area of each of the catechin monomers is measured by HPLC. EGO represents epigallocatechin, DC represents catechin, EGCG represents epigallocatechin gallate, EC represents epicatechin, GCG represents gallocatechin gallate, ECG represents epicatechin gallate. EC is converted to DC, and EGCG is converted to GCG upon heating a tea extraction liquid or a tea beverage, and such structural conversions cause the loss of freshness of the tea extraction liquid or tea beverage.)

TABLE 2

Change in the tea soup color of the tea beverages produced by the process without the control of oxygen and the process with the control of oxygen during storage.

| | | L value | a value | b value |
|---|---|---|---|---|
| Product 1 (green tea) | Finished product | 92.29 | −1.7 | 25.87 |
| | Storage at 38° C. for 1 month | 71.53 | 16.88 | 65.2 |
| | Storage at 38° C. for 2 months | 68.34 | 21.62 | 88.19 |
| Product of Example 1 (green tea) | Finished product | 93.81 | −3.12 | 17.02 |
| | Storage at 38° C. for | 91.53 | −1.65 | 25.21 |

TABLE 2-continued

Change in the tea soup color of the tea beverages produced by the process without the control of oxygen and the process with the control of oxygen during storage.

| | | L value | a value | b value |
|---|---|---|---|---|
| | 1 month | | | |
| | Storage at 38° C. for 2 months | 89.15 | 0.66 | 36.73 |
| Product 1 (scented tea) | Finished product | 91.33 | −0.91 | 28.69 |
| | Storage at 38° C. for 1 month | 80.37 | 10.88 | 43.6 |
| | Storage at 38° C. for 2 months | 76.1 | 16.72 | 56.8 |
| Product of Example 3 (scented tea) | Finished product | 92.41 | −1.87 | 22.62 |
| | Storage at 38° C. for 1 month | 91.10 | −0.29 | 26.48 |
| | Storage at 38° C. for 2 months | 90.89 | 1.02 | 39.32 |
| Product 1 (oolong tea) | Finished product | 91.68 | −1.01 | 31.76 |
| | Storage at 38° C. for 1 month | 80.21 | 6.87 | 47.23 |
| | Storage at 38° C. for 2 months | 68.93 | 19.62 | 64.65 |
| Product of Example 4 (oolong tea) | Finished product | 91.73 | −2.57 | 27.06 |
| | Storage at 38° C. for 1 month | 90.72 | −1.94 | 30.17 |
| | Storage at 38° C. for 2 months | 89.80 | −0.06 | 35.84 |
| Product 1 (black tea) | Finished product | 78.95 | 6.82 | 58.16 |
| | Storage at 38° C. for 1 month | 58.24 | 22.71 | 69.37 |
| | Storage at 38° C. for 2 months | 33.93 | 35.69 | 76.86 |
| Product of Example 2 (black tea) | Finished product | 81.11 | 4.95 | 57.49 |
| | Storage at 38° C. for 1 month | 80.73 | 6.29 | 59.35 |
| | Storage at 38° C. for 2 months | 79.28 | 8.17 | 64.31 |

(Note: L value represents the lightness of a tea extraction liquid or a tea beverage, the more the value is reduced, the higher the turbidity of tea soup is; a value represents green/red degree of a tea extraction liquid or a tea beverage, a negative value represents red degree and a positive value represents a red degree, the larger the positive value is, the stronger the trend of color browning is; b value represents yellow/blue degree of a tea extraction liquid or a tea beverage, the larger the value is, the stronger the yellow degree is and the stronger the trend of color browning is in the tea soup.)

The invention is further illustrated by reference to the following examples.

EXAMPLE 1

Pure Tea Beverages of Green Tea 50 kg tea leaves of green tea and 2000 kg reverse-osmosis water that was deoxygenated and deionized (60° C., a dissolved oxygen content of ≤1 mg/L) were added to a closed extraction tank. The extraction by immersion was carried out for 25 minutes to obtain a green tea extraction liquid. The extraction liquid was cooled by a panel cooler and then was transferred into a closed holding tank and was centrifuged for 9 minutes. After centrifugation, the tea soup was filtrated with a hop-pocket to get a tea clear liquor. The tea clear liquor was transferred into a closed blending tank for blending, reverse-osmosis water that was deoxygenated and deionized, was added to a final weight of 8 tons, and then 1.6 kg ascorbic acid was added. The resulting mixture was agitated uniformly to get a blended liquid. The blended liquid was not degassed, and was directly subjected to UHT sterilization. During aseptic cold filling, PET plastic bottles were used, and pure tea beverages of green tea were obtained. All the tanks used in said process were closed; before pouring/transferring the reverse-osmosis water that was deoxygenated and deionized, the extraction liquid, the tea clear liquor, the blended liquid, and the like, into the corresponding tanks, high pure nitrogen (≥99%) was injected into the tanks to drive off air in advance; each of all the processes was carried out under nitrogen protection. During aseptic filling, the aseptic tank was pressured with aseptic high pure nitrogen (≥99%) (0.2 MPA), the PET bottles were purged with aseptic nitrogen before capping.

EXAMPLE 2

Pure Tea Beverages of Black Tea 50 kg tea leaves of black tea and 4000 kg reverse-osmosis water that was deoxygenated and deionized (90° C., a dissolved oxygen content of ≤1 mg/L) were added to a closed extraction tank. The extraction by immersion was carried out for 25 minutes to obtain a black tea extraction liquid. The extraction liquid was cooled by a panel cooler and then was transferred into a closed holding tank and was centrifuged for 15 minutes. After centrifugation, the tea soup was filtrated with a hop-pocket to get a tea clear liquor or juice. The tea clear liquor or juice was transferred into a closed blending tank for blending, reverse-osmosis water that was deoxygenated and deionized, was added to a final weight of 15 tons, and then 3.6 kg ascorbic acid was added. The resulting mixture was agitated uniformly to get a blended liquid. The blended liquid was not degassed, and was directly subjected to UHT sterilization. During aseptic cold filling, PET plastic bottles were used, and pure tea beverages of black tea were obtained. All the tanks used in said process were closed; before pouring/transferring the reverse-osmosis water that was deoxygenated and deionized, the extraction liquid, the tea clear liquor or juice, the blended liquid, and the like, into the corresponding tanks, high pure nitrogen (≥99%) was injected into the tanks to drive off air in advance; each of all the processes was carried out under nitrogen protection. During aseptic filling, the aseptic tank was pressured with aseptic high pure nitrogen (≥99%) (0.2 MPA), the PET bottles were purged with aseptic nitrogen before capping.

EXAMPLE 3

Pure Tea Beverages of Scented Tea 50 kg tea leaves of scented tea and 1500 kg reverse-osmosis water that was deoxygenated and deionized (80° C., a dissolved oxygen content of ≤1 mg/L) were added to a closed extraction tank. The extraction by immersion was carried out for 20 minutes to obtain a scented tea extraction liquid. The extraction liquid was cooled by a panel cooler and then was transferred into a closed holding tank and was centrifuged for 7 minutes. After centrifugation, the tea extraction liquid was filtrated with a hop-pocket to get a tea clear liquor or juice. The tea clear liquor or juice was transferred into a closed blending tank for blending, reverse-osmosis water that was deoxygenated and deionized, was added to a final weight of 10 tons, and then 5.0 kg ascorbic acid was added. The resulting mixture was agitated uniformly to get a blended liquid. The blended liquid was not degassed, and was directly subjected to UHT sterilization.

During aseptic cold filling, PET plastic bottles were used, and pure tea beverages of scented tea were obtained. All the tanks used in said process were closed; before pouring the reverse-osmosis water that was deoxygenated and deionized, the extraction liquid, the tea clear liquor or juice, the blended liquid, etc., into the corresponding tanks, high pure nitrogen (≥99%) was injected into the tanks to drive off air in advance; each of all the processes was carried out under nitrogen protection. During aseptic filling, the aseptic tank was pressured with aseptic high pure nitrogen (≥99%) (0.2 MPA), the PET bottles were purged with aseptic nitrogen before capping.

EXAMPLE 4

Pure Tea Beverages of Oolong Tea 50 kg tea leaves of oolong tea and 2500 kg reverse-osmosis water that was deoxygenated and deionized (95° C., a dissolved oxygen content of ≤1 mg/L) were added to a closed extraction tank. The extraction by immersion was carried out for 15 minutes to obtain an oolong tea extraction liquid. The extraction liquid was cooled by a panel cooler and then was transferred into a closed holding tank and was centrifuged for 10 minutes. After centrifugation, the tea extraction liquid was filtrated with a hop-pocket to get a tea clear liquor or juice. The tea clear liquor or juice was transferred into a closed blending tank for blending, reverse-osmosis water that was deoxygenated and deionized, was added to a final weight of 16 tons, and then 6.4 kg ascorbic acid was added. The resulting mixture was agitated uniformly to get a blended liquid. The blended liquid was not degassed, and was directly subjected to UHT sterilization. During aseptic cold filling, PET plastic bottles were used, and pure tea beverages of oolong tea were obtained. All the tanks used in said process were closed; before pouring reverse-osmosis water that was deoxygenated and deionized, the extraction liquid, the tea clear liquor or juice, the blended liquid, and the like into the corresponding tanks, high pure nitrogen (≥99%) was injected into the tanks to drive off air in advance; each of all the processes was carried out under nitrogen protection. During aseptic filling, the aseptic tank was pressured with aseptic high pure nitrogen (≥99%) (0.2 MPA), the PET bottles were purged with aseptic nitrogen before capping.

The invention claimed is:
1. A method for producing a tea beverage, consisting of the following steps:
   1) immersing and extracting tea leaves not previously extracted, with reverse-osmosis water that is deoxygenated and deionized and has a temperature of 40-95° C. and an oxygen content of ≤1 mg/L, the tea leaves and water being in a ratio of 1:20-120 by weight, the reverse-osmosis water being contained in a closed water tank, and ≥99% nitrogen is injected into the top of the closed water tank, the extraction of tea leaves is carried out for 10-40 minutes in a closed extraction tank to obtain an extraction liquid of the tea leaves, >99% nitrogen is injected to replace air in the closed extraction tank prior to extraction, and the extraction is carried out under nitrogen protection;
   2) filtrating or clearing the extraction liquid of the tea leaves by centrifugation and a pocket filter to obtain a filtrated extraction liquid, wherein closed tanks are used during filtration or clearing; ≥99% nitrogen is injected to replace air in each of the closed tanks in advance, and the filtrating or clearing process is carried out under nitrogen protection;
   3) transferring the filtrated extraction liquid into a closed blending tank, diluting and blending it with the reverse-osmosis water that is deoxygenated and deionized, at a ratio of 1:1-10 by weight to obtain a diluted extraction liquid, and adding an antioxidant, wherein ≥99% nitrogen is injected to replace air in the closed blending tank in advance, and the whole process of step 3) is carried out under nitrogen protection;
   4) subjecting the product of step 3) to ultra high temperature short time sterilization (UHT), wherein no degassing treatment is performed on the product of step 3) after step 3) and before UHT; and
   5) subjecting the product of step 4) to aseptic cold filling by using PET plastic bottles to get various tea beverages, wherein during aseptic cold filling, mouths of the bottles are purged with nitrogen before capping the PET bottles, so as to reduce oxygen content of the air in top gap of the bottles.
2. The method according to claim 1, wherein the tea leaves are selected from the group consisting of green tea, oolong tea, and black tea.
3. The method according to claim 1, wherein the antioxidant is ascorbic acid, in an amount of from 0.02 to 0.05 wt % of the total amount of the diluted extraction liquid.
4. The method according to claim 1, wherein the product of in step 4) has a dissolved oxygen content of ≤1 mg/L.
5. A method for producing a tea beverage, consisting of the following steps:
   1) performing an immersion and extraction of tea leaves not previously extracted, with reverse-osmosis water that is deoxygenated and deionized and has a temperature of 40-95° C. and an oxygen content of ≤1 mg/L, the tea leaves and water being in a ratio of 1:20-120 by weight, the reverse-osmosis water being contained in a closed water tank, and ≥99% nitrogen is injected into the top of the closed water tank, the extraction of tea leaves is carried out for 10-40 minutes in a closed extraction tank to obtain an extraction liquid of the tea leaves, >99% nitrogen is injected to replace air in the closed extraction tank prior to extraction, and the extraction is carried out under nitrogen protection;
   2) filtrating or clearing the extraction liquid of the tea leaves by centrifugation and a pocket filter to obtain a filtrated extraction liquid, wherein closed tanks are used during filtration or clearing; ≥99% nitrogen is injected to replace air in each of the closed tanks in advance, and the filtrating or clearing process is carried out under nitrogen protection;
   3) transferring the filtrated extraction liquid into a closed blending tank, diluting and blending it with the reverse-osmosis water that is deoxygenated and deionized, at a ratio of 1:1-10 by weight to obtain a diluted extraction liquid, and adding an antioxidant, wherein ≥99% nitrogen is injected to replace air in the closed blending tank in advance, and the whole process of step 3) is carried out under nitrogen protection to obtain an antioxidant-containing diluted extraction liquid;
   4) subjecting the antioxidant-containing diluted extraction liquid to ultra high temperature short time sterilization (UHT) without performing a degassing treatment on the antioxidant-containing diluted extraction liquid before the UHT to obtain a sterilized antioxidant-containing diluted extraction liquid; and
   5) subjecting the sterilized antioxidant-containing diluted extraction liquid to aseptic cold filling by using PET plastic bottles to obtain various tea beverages, wherein during aseptic cold filling, mouths of the bottles are purged with nitrogen before capping the PET bottles, so as to reduce oxygen content of the air in top gap of the bottles.

\* \* \* \* \*